(12) United States Patent
Rodrigues et al.

(10) Patent No.: US 7,665,097 B2
(45) Date of Patent: Feb. 16, 2010

(54) ASSOCIATING NOTIFICATIONS OF THE STATUS OF A DATA NETWORK BY USE OF A TOPOLOGY EDITOR

(75) Inventors: Northon Rodrigues, Oregon City, OR (US); Laxman Jodumatt Bhat, Mangalore (IN); Anil Sharma, Bangalore (IN); Krishna Nadh Manepalli, Andhra Pradesh (IN); Chittepu Venkatarami Reddy, Bangalore (IN); Suma, Bangalore (IN)

(73) Assignee: Thomson Licensing, Boulogne-Billancourt (FR)

( * ) Notice: Subject to any disclaimer, the term of this patent is extended or adjusted under 35 U.S.C. 154(b) by 115 days.

(21) Appl. No.: 10/527,576

(22) PCT Filed: Sep. 12, 2003

(86) PCT No.: PCT/US03/28864

§ 371 (c)(1),
(2), (4) Date: Mar. 11, 2005

(87) PCT Pub. No.: WO2004/025465

PCT Pub. Date: Mar. 25, 2004

(65) Prior Publication Data

US 2005/0251782 A1    Nov. 10, 2005

Related U.S. Application Data

(60) Provisional application No. 60/410,118, filed on Sep. 12, 2002.

(51) Int. Cl.
G06F 13/00    (2006.01)

(52) U.S. Cl. .................... 719/318; 709/220; 709/224

(58) Field of Classification Search .................. 719/318; 709/220, 224
See application file for complete search history.

(56) References Cited

U.S. PATENT DOCUMENTS

| 5,930,476 | A | 7/1999 | Yamunachari et al. |
| 6,182,157 | B1 | 1/2001 | Schlener et al. |
| 6,298,378 | B1 * | 10/2001 | Angal et al. ................ 709/223 |
| 6,438,618 | B1 * | 8/2002 | Lortz et al. ................. 719/318 |
| 6,516,326 | B1 * | 2/2003 | Goodrich et al. ......... 707/104.1 |

(Continued)

FOREIGN PATENT DOCUMENTS

CN    1265796 A    9/2000

(Continued)

OTHER PUBLICATIONS

Search Report Dated November 26, 2003.

*Primary Examiner*—Andy Ho
(74) *Attorney, Agent, or Firm*—Robert D. Shedd; Harvey D. Fried; Joel M. Fogelson

(57) ABSTRACT

A method for assigning an event to a device on a network is described by using a topology editor as user-controlled interface. The event is represented as a labeled graphic indication. Other devices on a data network, also represented graphically, are to be assigned to the event by using the user-controlled interface. A rule is then defined and associated with the event. When a condition, as defined by the rule is met by an application or device on the network, all of the devices assigned to the event are notified of the condition met by the rule in accordance with such graphically defined relationships.

11 Claims, 7 Drawing Sheets

U.S. PATENT DOCUMENTS

| | | |
|---|---|---|
| 7,003,559 B1 | 2/2006 | Nataraian et al. |
| 7,012,895 B1 | 3/2006 | Mir |
| 7,016,313 B1 | 3/2006 | Harper |
| 7,020,145 B1 | 3/2006 | Symons et al. |
| 7,152,075 B2 * | 12/2006 | Vining et al. ............ 707/104.1 |
| 7,284,048 B2 * | 10/2007 | Jakobson et al. ............ 709/224 |
| 2003/0061349 A1 * | 3/2003 | Lo et al. ..................... 709/225 |
| 2003/0071845 A1 * | 4/2003 | King et al. ................... 345/764 |
| 2003/0167352 A1 * | 9/2003 | Hoshiai et al. ............... 709/318 |
| 2004/0261083 A1 * | 12/2004 | Alcazar et al. ............... 719/318 |

FOREIGN PATENT DOCUMENTS

| | | |
|---|---|---|
| CN | 100385400 C | 10/2005 |
| EP | 1 000 485 B1 | 2/2005 |
| JP | 4-23639 A | 1/1992 |
| JP | 6-348616 A | 12/1994 |
| JP | 9-101932 | 4/1997 |
| JP | 9-172435 | 6/1997 |
| JP | 10-075245 | 3/1998 |
| JP | 10-247926 A | 9/1998 |
| JP | 11-312134 | 11/1999 |
| JP | 2001-188726 A | 7/2001 |
| JP | 2002-140242 | 5/2002 |
| WO | WO 2004/025465 A1 | 3/2004 |

* cited by examiner

ASSOCIATING NOTIFICATIONS OF THE STATUS OF A DATA NETWORK BY USE OF A TOPOLOGY EDITOR

This application claims the benefit, under 35 U.S.C. §365 of International Application PCT/US2003/028864, filed Sep. 12, 2003, which was published in accordance with PCT Article 21(2) on Mar. 25, 2004 in English and which claims the benefit of U.S. provisional patent application No. 60/410,118, filed Sep. 12, 2002.

FIELD OF INVENTION

The invention is related to the field of data networks, in particular the communication of the status of devices on a data network.

BACKGROUND OF THE INVENTION

In the operation of a data network, devices linked through the network communicate data back and forth to each other. Some of the data communicated represents a message representing the status of a device on the network. The substance of such a message may indicate conditions such as a device may be inoperative, currently busy processing data, the device is free to receive new data, and the like. When communicated to other devices on the network, the devices receiving such a message may change their operation in response to the message.

This type of communication of messages between devices on a network represents a point-to-point communication system, where one message is effectively broadcasted to all of the devices on a network. In the case of a network having many devices, it is possible that a considerable amount of network bandwidth in consumed by the presence of status messages. Moreover, many of these status messages are not relevant for a number of devices on the network. Hence, these devices have to commit resources to filtering such non-relevant messages while having network bandwidth wasted due to the communication of such messages.

One approach for limiting the waste of bandwidth is to use a computer program such as a firewall that prohibits certain types of messages or data from entering into a local network from an outside connection. The devices' that are connected through the local network are then spared from having bandwidth consumed by non-relevant messages. The configuration of a firewall or other filtering/monitoring program typically requires a system administrator to manually configure a variety of rules for each device of a network. Therefore, a large amount of time is devoted to this manual configuration operation, whereby it becomes difficult for a system administrator to modify the operation of a system, without devoting a large amount of time to implement such changes.

SUMMARY OF THE INVENTION

A method for assigning an event pertaining to the operation of a device on a network by using a user controlled topology editor. The event is represented as a labeled graphic indication. Devices on a network, also represented graphically, are assigned to the event by using the user-controlled interface. A rule is then defined and associated with the event. When a condition, as defined by the rule is met by the status of an application or device on the network, all of the device elements assigned to the event are notified of the condition met by the rule in accordance with a messaging standard.

Figure 1:
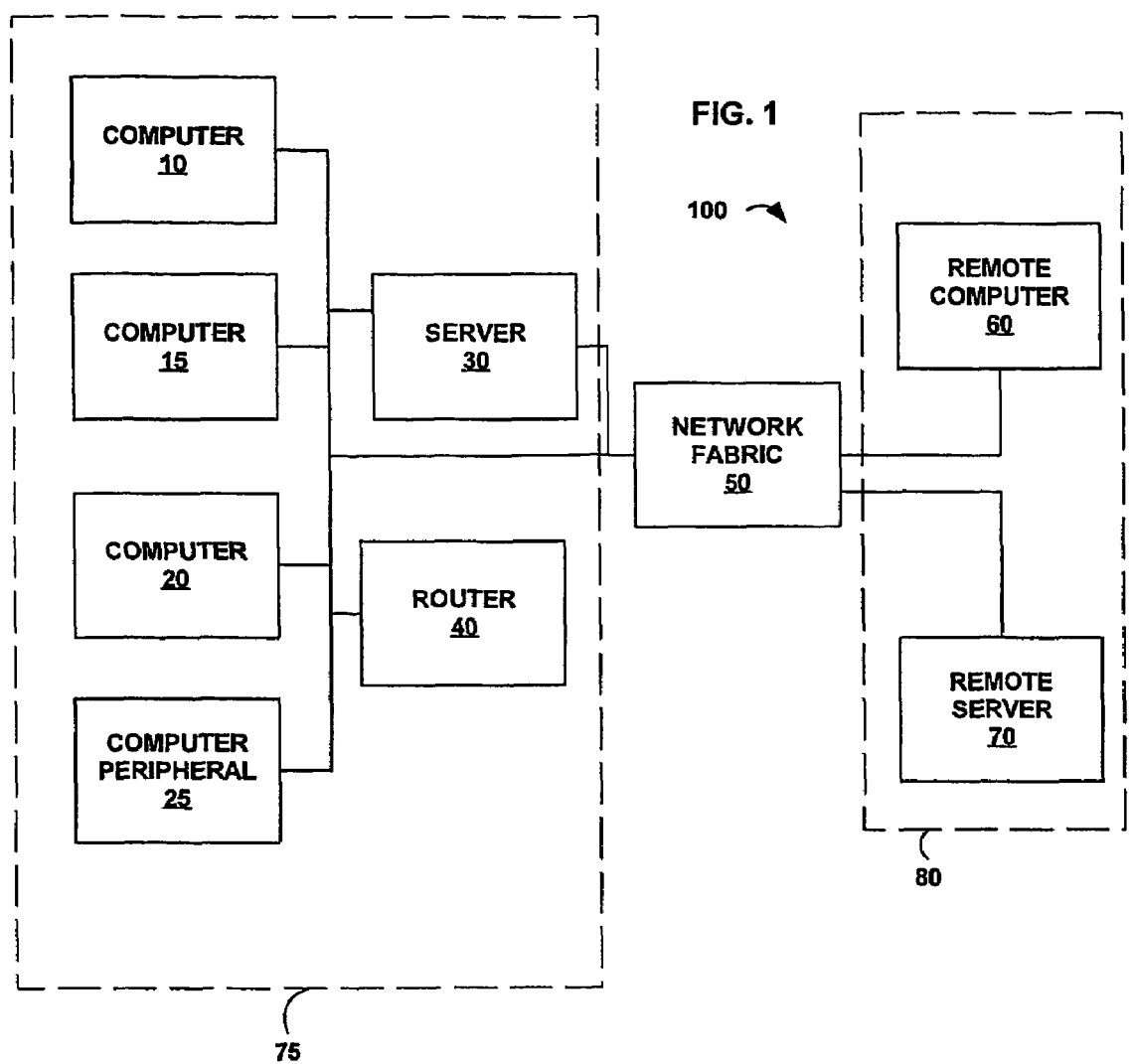
FIG. 1 is a block diagram of a data network in accordance with one embodiment of the present invention.

It should be understood that the drawings are for purposes of illustrating the concepts of the invention and are not necessarily the only possible configuration for illustrating the invention.

DETAILED DESCRIPTION

The preferred embodiment of the invention operates in consideration of the Simple Network Management Protocol (SNMP) as defined in the Request For Comments 2571 (RFC 2571) entitled AN ARCHITECTURE FOR DESCRIBING SNMP MANAGEMENT FRAMEWORK from April 1999. Although SNMP is described in the detailed description, any messaging system for use on a data network may be used, using the principles of the present invention. Additionally, the description of the user interface is preferably implemented for use by a web browser as INTERNET EXPLORER or NETSCAPE using a programming language as ACTIVEX or JAVA. Other forms of programming languages or interfaces may be selected in accordance with the principles of the present invention.

In reference to the operation of a SNMP standard, several terms are frequently used. A SNMP managed device is a network device that contains an SNMP agent and resides on a data network. Managed devices collect and store management information (such as disk errors, temperature, video and audio status) and make this information available to other networked devices using the SNMP protocol.

An SNMP agent is a software module that resides in a SNMP managed device. An agent has local knowledge of management information and translates device or network status information into a form compatible with SNMP.

An SNMP manager is an application that monitors SNMP managed devices. One or more managers (also referred to as management stations) many exist in a network and monitor any of the managed devices. An SNMP manager may also be used to control devices and/or network functions and a SNMP manager can operate as a SNMP agent.

A management information base (MIB) is a collection of managed objects (variables) that are properties of a device and are organized hierarchically. Each SNMP agent maintains it own the MIB. Additionally, MIBs are used as definition data for prescribing the relationship of a device's operation to format of a SNMP transmitted command, by use of a SNMP manager.

An SNMP trap, as a notification (as a type of action provider), enables an agent to notify a management station of significant events such as errors on a network or a device. Traps may be sent unsolicited on the network and will be received by management stations configured to display such traps for that device. Management stations also are able to communicate with other management stations by the use of traps.

Traps may be defined for different conditions or statuses pertaining to devices or a network. An informational trap indicates a change in the state in a system that does not impact normal operation. Informational traps also provide general information about a device or network such as configuration information, system set up, software version, and the like. A warning trap is a message that does not require immediate action but informs a user that some action may be necessary for system operation. For example, a warning trap indicates that a device on a network may soon run out of storage space. An alarm trap is a message that requires specific actions to be taken immediately. Both types of traps may be used as action providers that are notifications concerning information or an alarm condition related to the operation of the network.

A topology editor is a user-controlled interface that is used to establish functional relationships between devices on a data network, although any type of network may be used. For example, a topology editor is used to designate that output from a selected computer is outputted on a selected printer, this relationship is established through the use of graphic elements. Graphic elements represent icons, folders, or other representations that graphically indicate the function or status of a device on a network and the relationships between such devices. For instance, a computer icon represents a computer (on the data network) and a folder containing several computer icons represents a specific workgroup. Other uses of a topology editor and graphical elements are to be appreciated, in accordance with the principles of the present invention.

FIG. 1 represents a diagram of a data network in accordance with one embodiment of the present invention. Data network 100 is a networked system of computers, servers, routers, and other devices that communicate by the use of a computer protocol and transport system, as known in the art. Preferably, data network 100 uses a Transport Control Protocol/Internet Protocol (TCP/IP) as defined in RFC 791 entitled INTERNET PROTOCOL DARPA INTERNET PROGRAM PROTOCOL SPECIFICATION from September 1981, to communicate messages between devices. The SNMP messages are communicated on top of the application layer of a TCP/IP protocol stack, as known in the art. Alternatively, a User Datagram Protocol (UDP) transport layer as defined in RFC 768, entitled USER DATA PROTOCOL from August 1980, may be used for communicating traps or messages to devices on data network 100. In an alternative embodiment of the present invention, an instant messaging standard may also be used.

Computers 10, 15, 20 and 25 represent computers that are networked to each other through data network 100. Computers 10, 15, and 20, and 25 are connected to the network through the use of a communication interface such as a network card, modem, wireless interface, or other means capable of communicating data over of network. Typically, computers are used for running applications such as e-mail, video rendering, internet browsing, and the like, where data is required to be communicated over data network 100, in order for such programs to be operational. Preferably, computers 10, 15, and 20 are controlled through the use of a web browser and/or user interface capable of activating computer programs for monitoring the status of other devices on data network 100.

Computer peripheral 25 is a device coupled to data network 100 for use by computers 10, 15, and 20. Computer peripheral 25 may be a device such as a printer, data storage device, communication interface, CD-ROM, DVD player, display device, audio device, input interface, and the like.

Server 30, connected to data network 100, is used for obtaining computer data files and other related information for operating programs on computers 10, 15, and 20. For example, an Internet application running on computer 10 requires a data file from server 30. Once received through data network 100, the received data file is rendered on computer 10. Additionally, server 30 may operate as a web cache that stores frequently requested web pages and other data for use by computers 10, 15 and 20.

Router 40, as part of data network 100, is used as a means for communicating Internet Protocol requests to other devices accessible through network fabric 50, such as remote computer 60 and remote server 70. Specifically, data network 100 for illustrative purposes is separated into two different segments, local network 75 and remote network 80. Communications between both network segments are communicated through network fabric 50. Router 40 optionally acts as a filtering mechanism (firewall) to screen data transmitted and received from devices comprising remote network 80. Such filtering operations are known in the art. Additionally, router 40 may use a form of Network Addressable Translation (NAT) to further screen data from remote network 80 that may corrupt the operation of devices of local network 75.

Remote computer 60 and remote server 70 form remote network 80. The operation of both of these components is similar to computers 10, 15, and 20 and server 30, as described above, except that remote computer 60 and remote server 70 communicate to the devices forming local network 75 through network fabric 50. Additionally, such communications transmitted by remote computer 60 or remote server 70 are optionally filtered by router 40, or by any other type of filtering program that is present on computers 10, 15, and 20.

Figure 2:
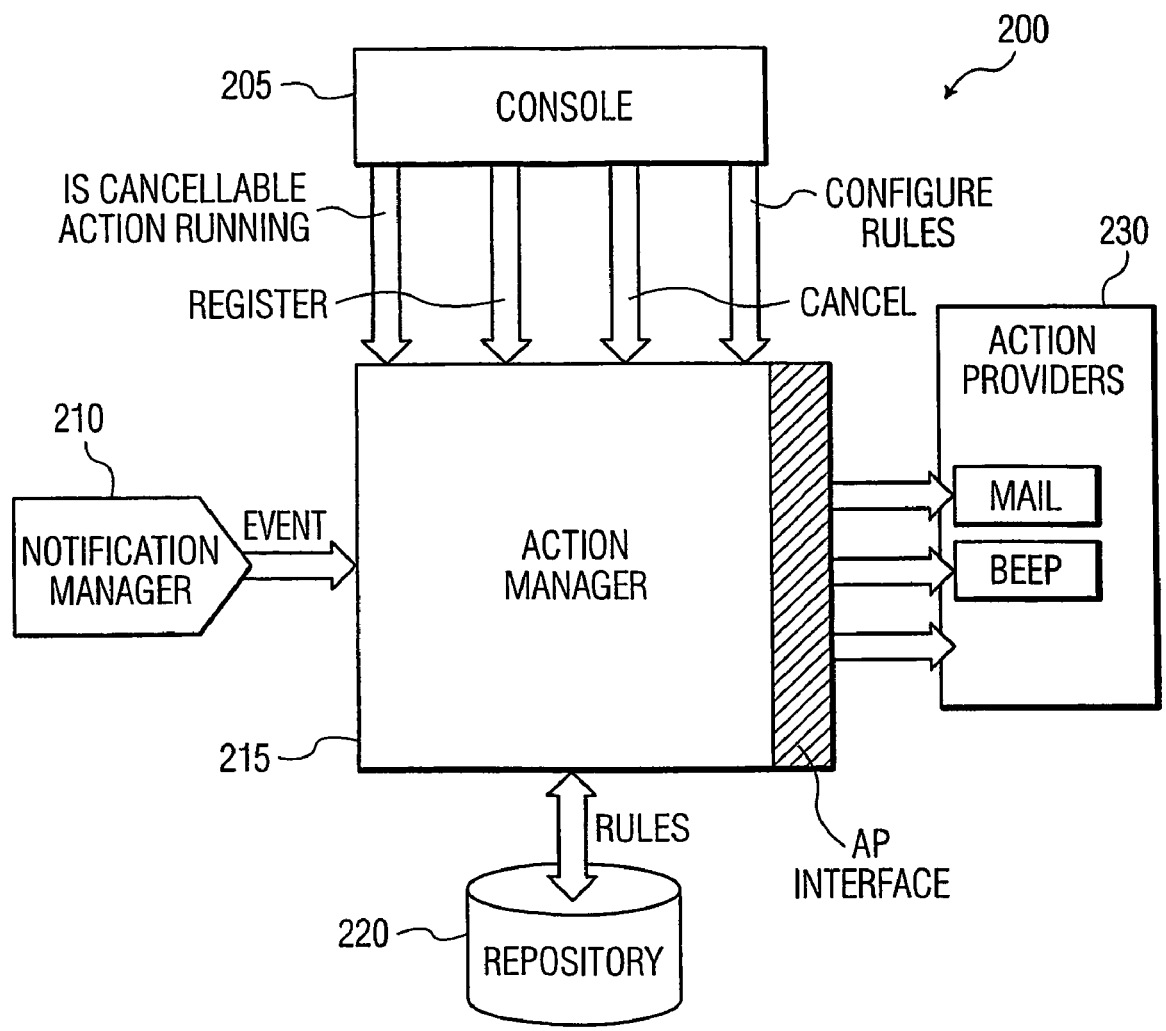
FIG. 2 is a block diagram of an operation of a messaging system in accordance with one embodiment of the present invention.

FIG. 2 is a block diagram of an operation of a messaging system in accordance with one embodiment of the present invention. In a preferred embodiment of the present invention, messaging system 200 operates in view of the SNMP messaging standard using of SNMP traps. The format of an SNMP trap comprises a SNMP version number (referring to the version of SNMP used), a community name (used for authenticating a SNMP trap), and SNMP Protocol Data Unit (PDU). The PDU is the message that forms the basis the error messages sent between devices on a network. Sample PDU commands and their function are shown in TABLE I.

TABLE 1

| PDU COMMANDS | |
|---|---|
| COMMAND | DESCRIPTION |
| getrequest | PDU command sent from SNMP manager to an agent to retrieve values of Object Identifiers (OID) representing events at the point at of the agent |
| getnextrequest | PDU command from SNMP manager to an agent for obtaining the next set of OID values from an agent |
| getresponse | PDU command from an agent to a SNMP manager that returns the OID values requested in the getrequest command |
| setrequest | PDU command from SNMP manager to agent that sets up the values representing an OID |
| trap | PDU command from agent to SNMP manager notifying the manager of an event |

Messaging system 200 is managed via a SNMP manager operated by console 205, preferably implemented as a user interface on a computer. Console 205 is a control interface that manages the operation of devices on data network 100 and the SNMP based messages communicated between such devices. In the present embodiment, console 205 controls operations such as registering a system event corresponding to the operation of a device, canceling an operation of a device, determining if the cancellation of an operation of a device has been activated, and the configuration of rules determining when selected devices are notified about a system event, although other operations may be controlled by console 205.

Different system events or system operations are distinguished from each other by having the SNMP manager (the functions represented by console 205) assign different OIDs to each event. The definitions for such events are obtained by using a MIB corresponding to a device, or a reference database that provides either a SNMP manager or agent the ability to look up an OID as part of a received PDU command.

The registration of a system event, via console 205, is for the definition of the applications or functions of a device residing on network 200. Such an operation would use a "setrequest" command with a corresponding OID as set up by an SNMP manager communicating with the appropriate SNMP agent. When communicated, the SNMP agent will return back a "trap" message to the SNMP manager indicating that such an operation has occurred. Alternatively, an SNMP manager may use a "setrequest" command to indicate to a device to proceed with or to terminate an operation.

In the present example, router 40 has an embedded web server that renders console 205 as a user interface that is accessed via a web browser and/or application capable of rendering HTML compatible code. Alternatively, console 205 is generated and controlled by a computer program accessible through the network such as action manager 215. In this embodiment, action manager 215 operates as an SNMP manager that controls the flow of messages representing the set up and communication of messages for a defined action provider (SNMP trap or notification).

A user operating computer 10 accesses the web server to enable and cancel the operation of different operations of devices on network 200, such communications are transmitted via SNMP, as explained above. By using console 205, a user enables (enables) a local Domain Name Server (DNS) application and virus filtering programming embedded within router 240. Action manager 215 in response to the commands issued through console 205 activates two SNMP messages that are transmitted to a SNMP agent that resides in router 40. One SNMP message corresponds to the activation of the DNS application, the other SNMP message activates the virus-filtering program. Other applications used as known in the art.

Figure 6:
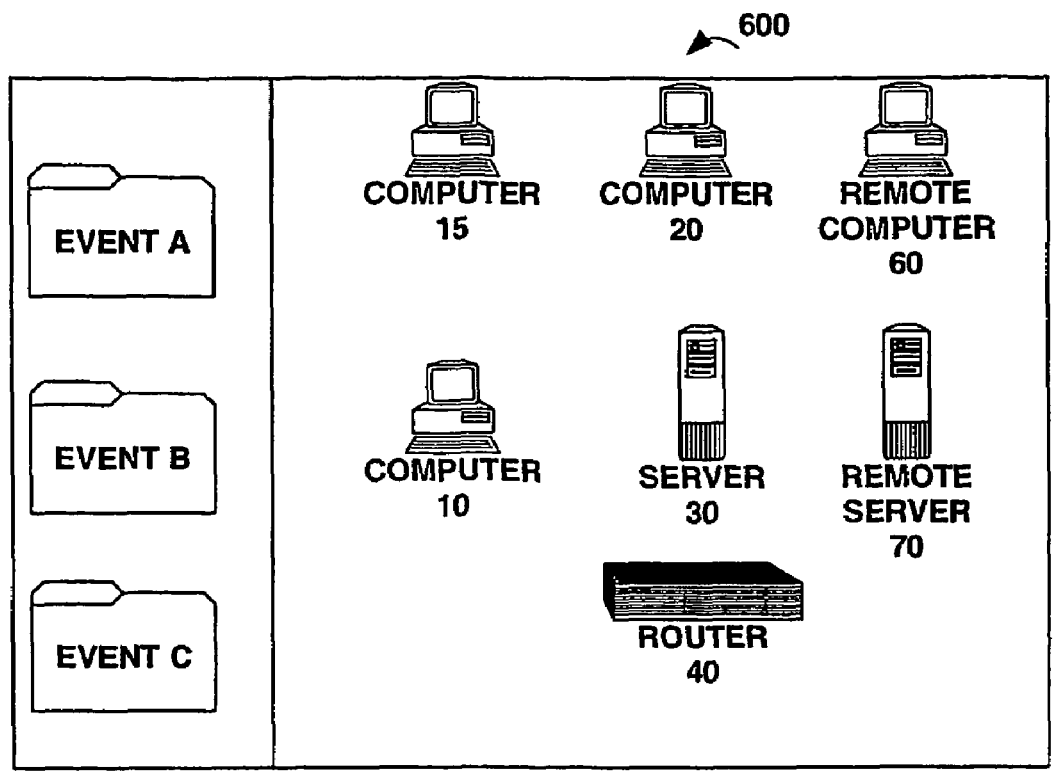
FIG. 6 is a representation of a user interface used for selecting rules and associated devices on the data network.
Figure 7:
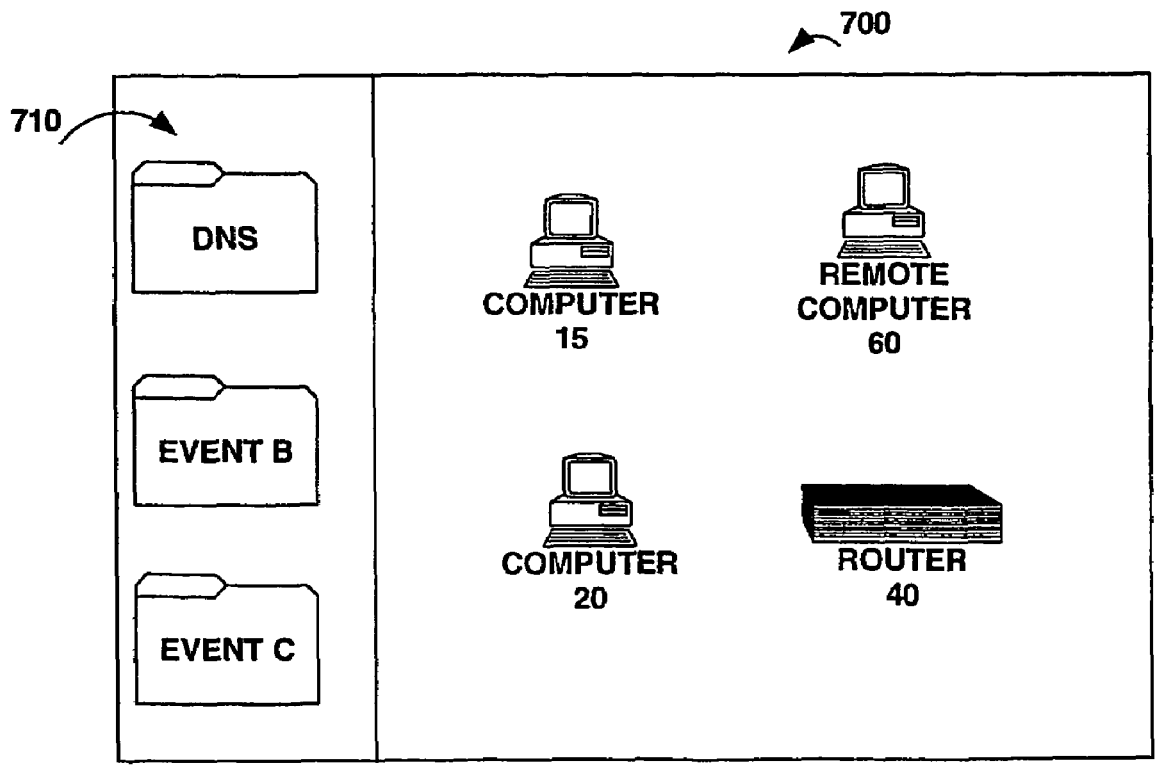
FIG. 7 is a representation of a user interface used for selecting a event and devices associated with the selected rule.
Figure 8:
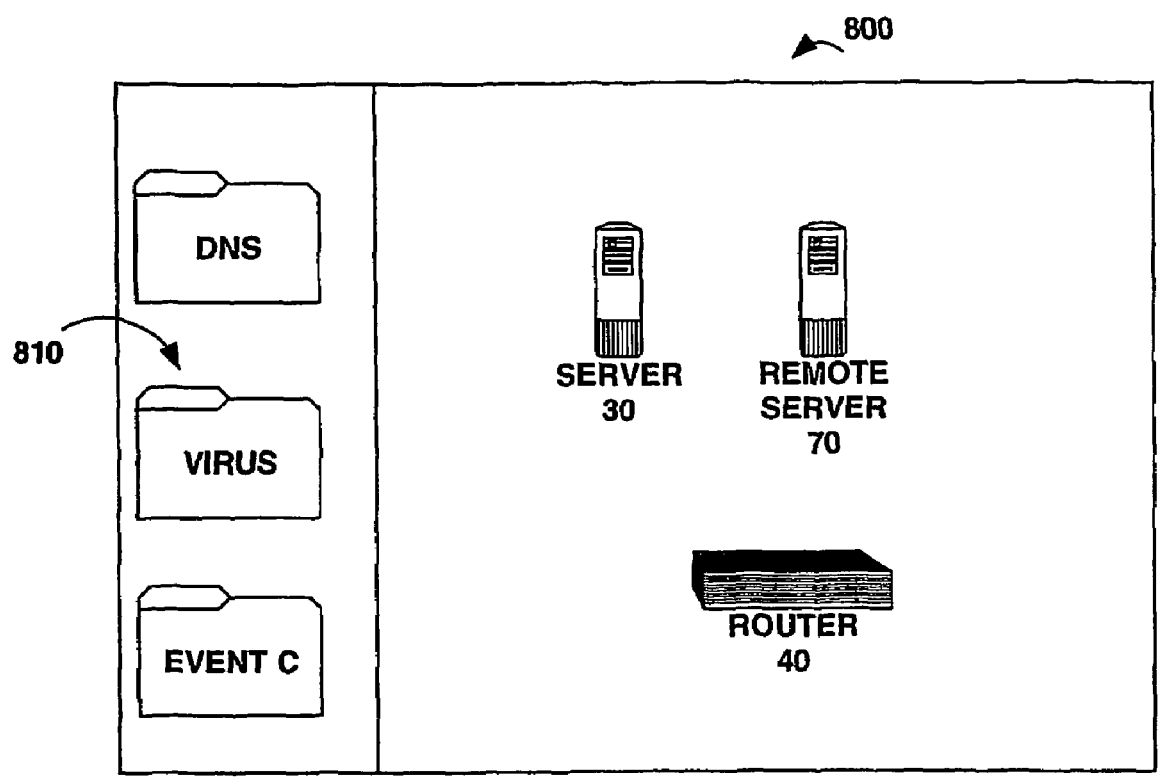
FIG. 8 is a representation of a user interface used for selecting a second event and devices associated with the second selected rule.

The assignment of both of the DNS and virus filtering application to server 30 is illustrated in FIGS. 6, 7, and 8. Specifically, a user controlled interface 600 is shown, in FIG. 6, where the different system applications are represented as folders labeled as EVENT A, EVENT B, and EVENT C, such labels may be changed at will. Additionally, user controlled interface 600 contains graphic representations of devices available through network 100 including computers 10, 15, and 20, server 30, router 40, remote computer 60, and remote server 70. By using user interface 600, a user establishes a connection between the graphic representations of devices and the "RULES" displayed as folders.

When a user desires to associate a rule to a device, the user selects a graphic representation of a device, for example by clicking an icon representing the device, and dragging such an icon into one of the rendered folders. In the present example, EVENT A represents the DNS application and EVENT B represents the virus protection application. In FIG. 7, a user interface 700 is shown where a user associates the DNS application to router 40, by having the user select the graphic representation of router 40 and dragging the representation over to folder 710 representing EVENT A now labeled as DNS. Console 205 now will associate any messages pertaining to the DNS application to router 40.

The assignment of an application to a device, by use of user interface 700 may be done actively or passively. In an active state, the SNMP manager controlled by user interface 700 (via action manager 215) sends a SNMP setrequest command to the SNMP agent corresponding to router 40. This setrequest as to tells the agent module to send any messages involving the DNS application to the SNMP manager as trap commands. A passive state involves the SNMP manager listening for messages regarding the DNS application, as broadcasted from the SNMP agent of router 40. In this case, the SNMP manager has not notified the SNMP agent to specifically broadcast messages concerning the DNS application to the SNMP manager. Other implementations of SNMP messaging (or other messaging systems) may be utilized, in accordance with the principles of the present invention.

Similarly in FIG. 8, a user interface 800 is shown where a user associates (registers) a virus protection application to router 40 by having the user select a graphic representation of router 40, and dropping the representation in folder 810, denoted as EVENT B now labeled as VIRUS. It is to be appreciated that other devices of a network may be associated with other applications, in the manner described above.

Referring back to FIG. 2, console 205 is also used to configure rules associated with particular program or event. As shown in FIG. 6, a folder representing a particular program may also be used to associate an event with such a program. For example, the DNS application for server 40 may be configured to transmit an event notification to certain devices on the network when a requested domain name is unable to be resolved. The condition determining when such an event notification is issued, and to which devices, is configured by using the user interface 700 of FIG. 7. In addition to router 40 being associated with folder 710, computers 10 and 20, and remote computer 60 are associated with folder 710 by using the registration approach described above.

This approach may be done where the SNMP manager program operated as part of the action manager 215 informs router 40 to transmit SNMP trap messages to all devices associated with folder 710. This is done by using either a series of SNMP "setrequest" commands for each device to be informed or a global "setrequest" command. Alternatively, the SNMP manager may forward any received SNMP trap commands regarding the operation of the DNS application to all of the devices associated with folder 710. Additionally, SNMP messages issued as action providers by the SNMP manager, may be used to control the operation of devices of the data network. Other implementations of notifying devices may be selected, in accordance with the principles of the present invention.

Figure 3:
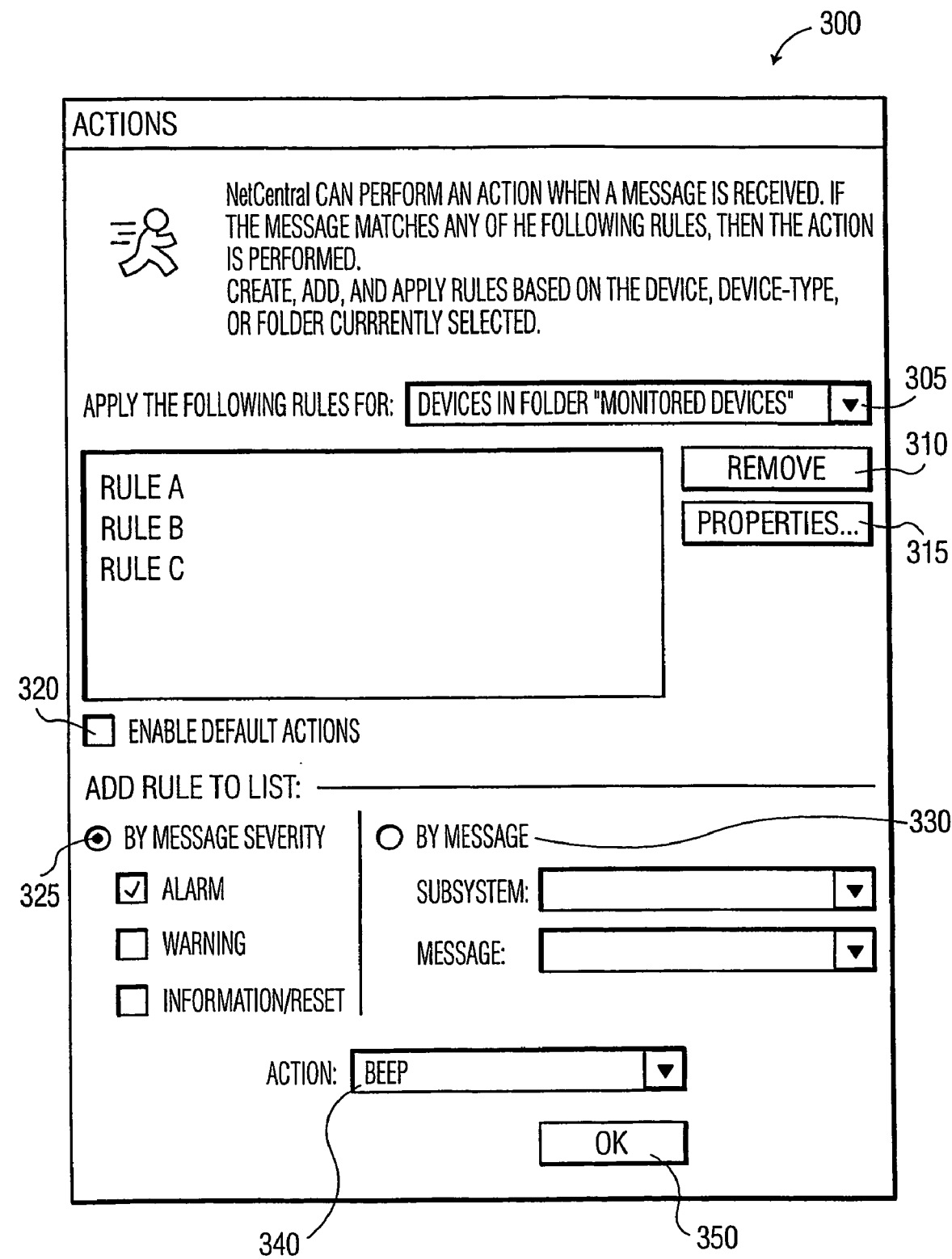
FIG. 3 is a representation of a graphic window for defining an event associated with a device on the data network.

Rules pertaining to a specific folder are configured by selecting options as presented in the example of FIG. 3. Specifically, when user selects folder 710, an actions entry window 300 (or menu) is generated, such a window is operated in as part of the user controlled interface. Event selection tab 305 provides a point of selection for a user to select between different folders representing different system events. Rule window 320 allows a user to create or define the attributes for specific rules defined for a specific event. In the present example, a new rule is added to rule window 320 by "right-clicking" any part of the area defined by rule window 320. Properties of the new rule are defined by selecting the rule in rule window 320 and enabling properties button 315. Correspondingly, the rules configured relate to the SNMP commands that set up the messages transmitted between SNMP agents and SNMP managers, as described above.

Examples of types of modifiable properties associated with a rule are shown as message severity option 325, message option 330, and action option 340. Message severity option 325 establishes the notification priority of an event when the conditions of a rule are met. In the present example, an alarm notification pertains to an event of a high priority, a warning pertains to an event of a medium priority, and an information/reset pertains to an event associated with a low priority.

Message option 330 enables a user to select a class of message that triggers a defined rule. For example, classes of messages include error messages indicating an error in the operation an application, status messages indicating the status of a device, termination messages indicating the completion of tasks, and other messages classes that may be grouped based on the content of the messages. Similarly, messages may also be allocated assigned by subsystem, for instance all the messages pertaining to different classes of devices such servers, computers, peripheral devices and the like, or by type of application. When the SNMP manager receives a message of a particular class, the defined rule may be triggered.

Action option 340 presents options controlling the rendering of event notifications as SNMP messages. Specifically, these instructions tell an SNMP agent or other SNMP manager how to render an event notification. Various options include a sound (beep), a visual alert, a text alert, and/or a combination thereof. Selected options for a specific event are confirmed by activating OK button 350. The selected or modified rules pertaining to an event are then saved to repository 220 (see FIG. 2), after confirmation for the operation of the SNMP manager. Alternatively, other modalities may be selected for action option 340, such as e-mail to a remote device, a pager alert, or other notification modality to a remote device.

Figure 4:
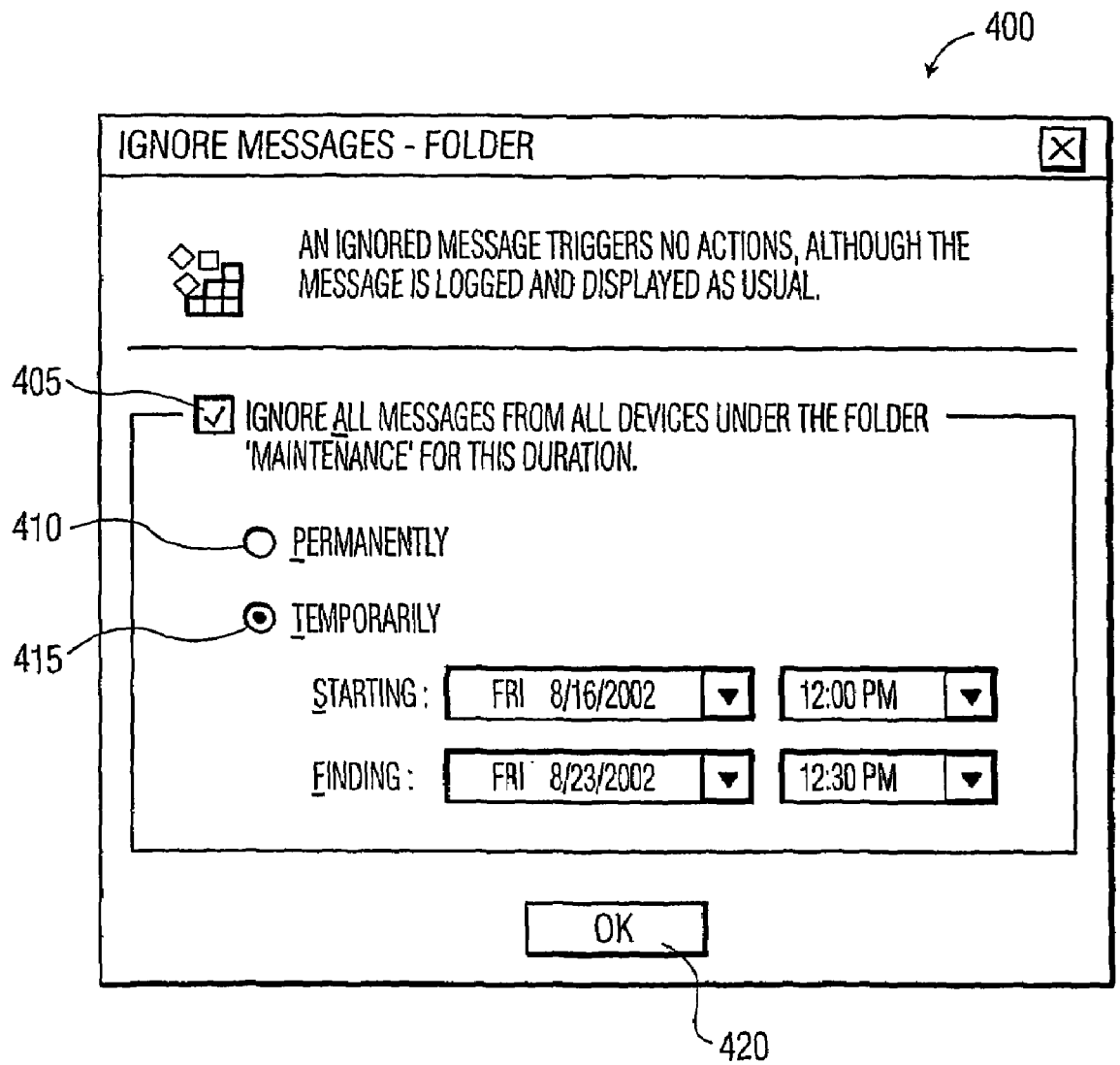
FIG. 4 is a representation of a graphic window used for defining when an event notification is issued to a device on the data network.

FIG. 4 is a representation of a graphic window used for defining options affecting event notification issuance to a device on the data network, in accordance with an embodiment of the present invention. Many different options may be implemented as to control how or when an event notification is rendered. In the current example, an ignore message option is shown, with ignore message window 400 representing a global option that allows a user to use a user interface to have messages (SNMP traps) concerning a event be ignored by devices on the network. The activation of window 400 is enabled by a user selecting a folder (as shown in FIG. 6) and using a user controlled device to select an ignore message option.

Message window 400, provides an ignore all messages option 405, that squelches all of the messages related to a system event. The duration of the ignore operation may be set either as a permanent operation by selecting permanent selector 410 or temporarily by selecting temporary selector 415 and defining a duration of time for this option to be active. A user selects a starting and ending time for the activation of the temporary ignore option. The selected options are confirmed by activating OK button 420. The selections are then saved to repository 220 (see FIG. 2), after confirmation.

Referring back to FIG. 2, the options selected via console 205 controls the operation of action manager 215 that integrates the set up, communication, and routing of messages through a network. All of the components that communicate with action manager 215 exist as part of a computer program, application program interface (API), or other type of component capable of communicating messages over a network. Specifically, all of the options selected via console 205 are stored in repository 220 by action manager 215. Repository 220 may be a storage device or other means capable of storing MIB and OID data and/or other types of definition data.

The operation of action manager 215 is conducted through the monitoring of system messages received through notification manager 210, which are part of the workflow of a SNMP manager, for an illustrative embodiment of the present invention. Such messages are the system or status messages (SNMP traps) generated by devices on a network to indicate the different types of operations. In the present example, router 40 generates messages concerning the operation of a DNS application or a virus protection application that are transmitted to devices over network 100. Preferably, router 40 specifically transmits a status message about the operation of an application that is received and processed by notification manager 210. The format of such a message may be a SNMP based message, e-mail, or any other type of messaging modality capable relaying a notification. Optionally, notification manager monitors traffic on network 100 specifically looking for data defined as status messages, as known in the art such as, and not limited to error conditions of devices or the operational status of such devices.

Once a message is received, notification manager 210 forwards the substance of the message to action manager 215, such as Internet Protocol address of the message's origin, the application referred to in the message, and the indicated status in the message. Action manager 215 then compares the substance of the received message to the rules pertaining to the operation of an event by using MIB data or other data for such definitions.

If the received status message matches conditions defined for one of the rules, action manager 215 prepares an action notification associated with the matching rule. Specifically, the action notification will be a status message as defined by the conditions of a matching rule. If the conditions of a rule are matched, action manager 215 communicates the action notification to action provider 230 for dissemination to network devices, as defined by the event group related to the matching rule. In an illustrative embodiment of the present invention, the SNMP manager informs all SNMP agents associated with each device of an event group by the use of a SNMP trap. Optionally, action manager 215 instructs action provider 230 how the action notification is to be rendered on a notified device, such as an audible, visual, and/or text notification, as described above.

Figure 5:
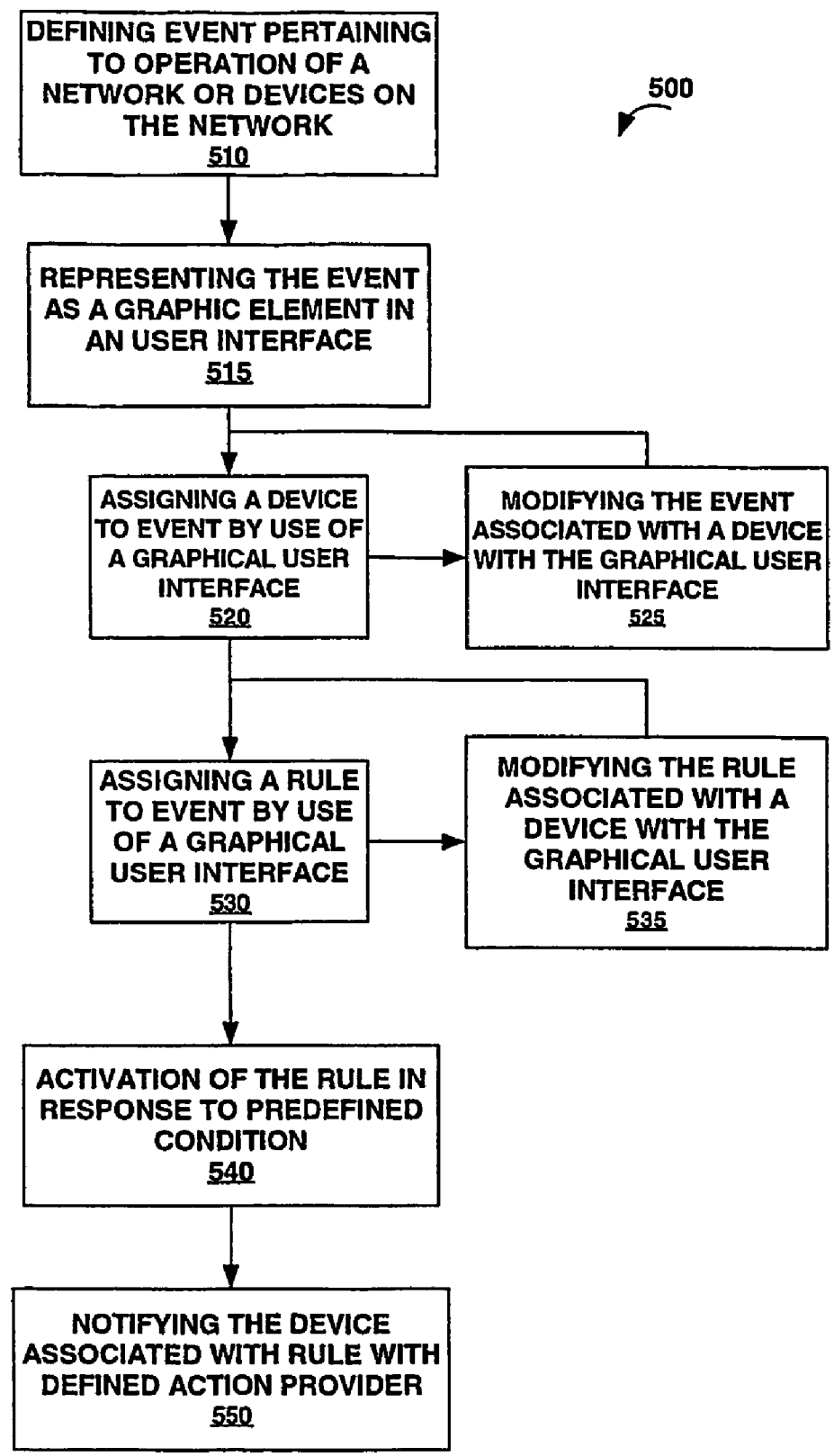
FIG. 5 is a flowchart illustrating a method of defining and implementing a rule associated with an event for a device on the data network.

FIG. 5 is a flowchart illustrating a method of defining and implementing a rule associated with an event for a device on a data network. Rule definition process 500 begins with the definition of an event pertaining to the operation of a network or devices on the network in step 510. As described above, the event is assigned a definition by use of a user interface (as shown in FIGS. 6, 7, and 8) generated by console 205 and action manager 215. The user interface renders the event as a graphic element as a folder, icon or other type of graphic representation (step 515). In the preferred case, the graphic element is also labeled with text as to indicate the operation represented by the event. For example, in FIG. 7, folder 710 labeled as DNS represents an event relating to the operation of a DNS server.

In step 520, the user interface is used to assign a device to a particular event. In the preferred embodiment, a graphic representation of a device on a network is selected, by use of a mouse, and is dragged to a folder representing an event. Once the graphic representation of a device is dropped into the folder, the selected device will be notified of any actions that are related to the event when a rule is activated. Step 525 allows a user to modify an event associated with a device by using a user-controlled interface. This operation allows more devices to be associated with an event, or attributes of the event (such as the label the event) can be modified, A rule is assigned to a selected event in step 530. This is step is also enabled by a user operating a user interface and creating a rule, as shown in FIG. 3. The options of the rule may be modified in step 535 as accomplished by using the user interface. When created or modified, the rule is preferably stored in repository 220 as at least one condition that is activated when information in a message (as received by notification manager 210) matches such a condition, as defined by definition data, OID or MIB data.

A rule associated with an event is activated in step 540 upon the matching of a predefined condition or set of predefined conditions. Preferably, action manager 215 compares a received system message to a set of rules, as stored in repository 220. If the message matches the conditions for a particular rule, step 550 is activated where the device or devices associated with the event, as an event group, are transmitted an action notification in accordance with the conditions defined by the activated rule. The notification is transmitted, as an SNMP trap, over a data network by action provider 230 for rendering on a device that is associated with the event. Such a rendering operation is a visual, audible, and/or text message, performed either in accordance with instructions in the notification or as default options at the site of the device rendering such a notification.

In an alternative embodiment of the present invention, a topology editor is used to define the relationships between different consumer devices coupled through the use of a data network. For example, a set of HAVI (a consumer device interoperability standard) enabled devices are configured to communicate with each other, through the use of the user interface described above. Hence, a Personal Video Recorder (PVR) would be capable of communicating with a television set if conditions describing the operation of the PVR are met such as a warning about a shortage of storage space. The PVR communicates the warning message to other HAVI enabled devices. In this case, the topology editor defines the type of messages to be rendered and how such messages should be rendered on a receiving device. Hence, the television set renders the PVR warning message in accordance with the parameters defined by the topology editor. Other examples of the use of a topology editor are to be appreciated, in accordance with the principles of the present invention.

It is appreciated that other modalities may be used to translate and system messages. Having described preferred embodiments for SNMP based messaging system it is noted that modifications and variations can be made by persons skilled in the art in light of the above teachings for other messaging modalities such as e-mail, SOAP, instant messaging, and the like. It is therefore to be understood that changes may be made in the particular embodiments of the invention disclosed which are within the scope and spirit of the invention.

The invention claimed is:

1. A method for using a topology editor to prescribe a device notified in response to an event related to the operation of a data network and said event comprising the steps of:
    defining said event pertaining to said operation of a data network, wherein said operation concerns at least one of: the status of the data network or a device of said data network;
    assigning a group consisting of a plurality of devices of said data network to be notified in response to said event by use of said topology editor;
    assigning a rule to said event, wherein said rule defines at least one condition for triggering a notification of said event to said assigned device, and
    said condition is to be activated when matched to a notification of the operation of said data network.

2. The method of claim 1, wherein the topology editor controls an Simple Network Management Protocol manager that transmits a Simple Network Management Protocol trap in response to an activated rule.

3. The method of claim 1, wherein an event group is defined for assigning a second device to said event by using said topology editor.

4. The method of claim 3, wherein said device and said second device of said event group are notified with an action provider when said condition is matched to said notification.

5. The method of claim 4, wherein said notification is rendered in view of a severity option.

6. A method for using a topology editor to notify a group of devices in response to an event related to the operation of a data network comprising the steps of:
    receiving a notification related to the operation of the data network, wherein said operation is related to a status of the data network or a device of the data network;
    comparing said notification to a condition of a rule;
    notifying a defined group of devices in response to said event with an action provider, wherein notification of said defined group of devices in response to said event is defined by use of said topology editor.

7. The method of claim 6, wherein said topology editor controls an Simple Network Management Protocol manager that transmits Simple Network Management Protocol trap in response to an activated rule.

8. The method of claim 6, wherein an event group is defined for assigning a second device to said event by using said topology editor.

9. The method of claim 8, wherein the devices of said event group are notified with the action provider upon the matching of said condition of said rule to said notification.

10. The method of claim 6, wherein said topology editor operates with in view of a consumer electronics enabled interoperability standard.

11. The method of claim 6, wherein said topology editor is used to control an action manager for controlling the operation of said device in view of a second action provider.

* * * * *